Figure 1:
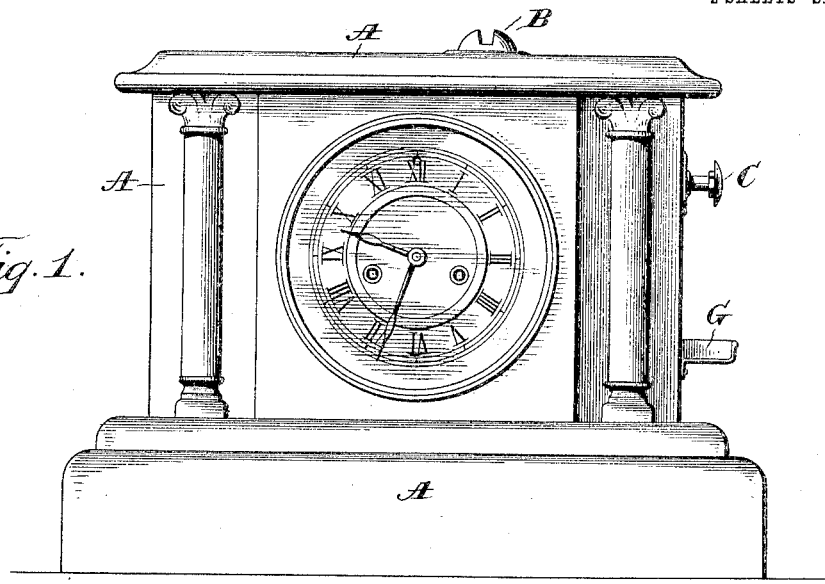

No. 789,547. PATENTED MAY 9, 1905.
W. C. JONES.
COIN CONTROLLED VENDING MACHINE.
APPLICATION FILED FEB. 5, 1903.

2 SHEETS—SHEET 1.

Witnesses:
Jas. E. Hutchinson
Calvin P. Milans

Inventor.
William C. Jones,
by Bacon & Milans
Attys.

No. 789,547. PATENTED MAY 9, 1905.
W. C. JONES.
COIN CONTROLLED VENDING MACHINE.
APPLICATION FILED FEB. 5, 1903.
2 SHEETS—SHEET 2.
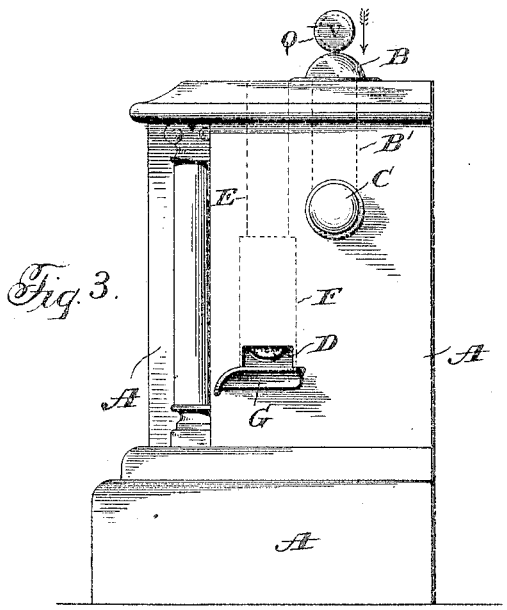
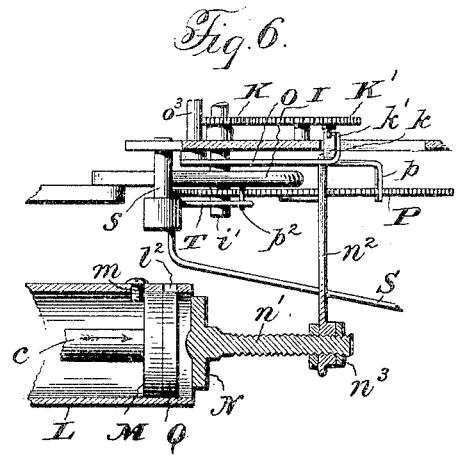
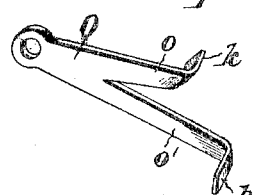
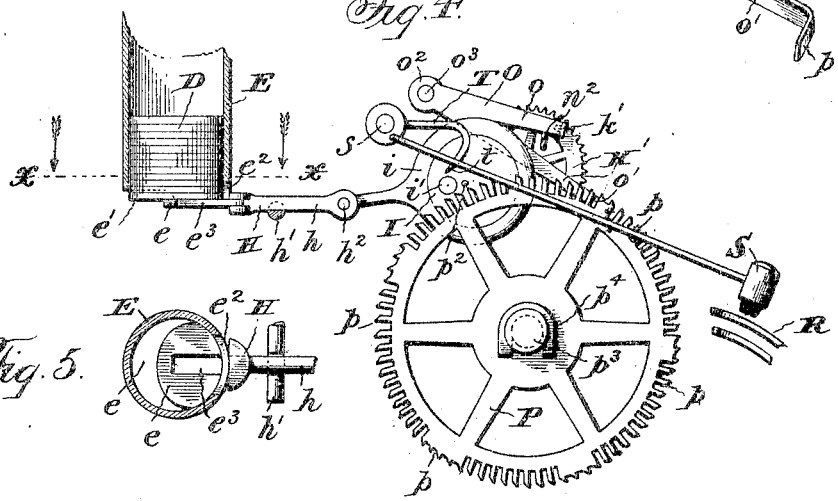
Witnesses:
Jas E Hutchinson
Calvin T Milans
Inventor.
William C Jones
by Bacon & Milans
Attys.

No. 789,547.                                        Patented May 9, 1905.

UNITED STATES PATENT OFFICE.

WILLIAM C. JONES, OF NIATIC, ILLINOIS.

COIN-CONTROLLED VENDING-MACHINE.

SPECIFICATION forming part of Letters Patent No. 789,547, dated May 9, 1905.

Application filed February 5, 1903. Serial No. 141,960.

*To all whom it may concern:*

Be it known that I, WILLIAM C. JONES, a citizen of the United States, residing at Niatic, in the county of Macon and State of Illinois, have invented certain new and useful Improvements in Coin-Controlled Vending-Machines, of which the following is a specification, reference being had therein to the accompanying drawings.

This invention relates to an improved vending-machine designed to automatically deliver any desired article to be sold.

The invention contemplates the provision of a machine adapted to be actuated by a coin or check to eject indicators which will designate a desired number of articles, such as cigars, to which the holder of the same is entitled in consideration for the previously-deposited actuating coin or price paid for the actuating-check. The machine is by preference constructed to make sales or deliver the articles at wholesale rates. For instance, as the ordinary five-cent cigar is sold at the rate of six for twenty-five cents, the several parts of the mechanism are so proportioned and operatively associated that during a certain number of sales made by the machine, each for a given price or consideration, there will be at predetermined periods an over or extra delivery of goods or checks therefor, which will be in the nature of a surprise premium to the particular purchasers operating the machine at such time. The sales, however, are so made that every purchaser gets the usual value for his money, say one cigar for five cents, while the lucky purchaser or purchasers may get two, three, or any predetermined number of said cigars for five cents, in the latter instances all cigars in addition to the usual one constituting the premium before referred to. These premium articles are simply those which are ordinarily thrown in at wholesale rates—as, for example, the sixth cigar when the article being vended is the proverbial six-for-a-quarter cigar—so that at each loading of the machine the owner or proprietor thereof will receive in consideration for the entire number of sales made by said machine the same rate as he would ordinarily receive in a wholesale disposition of the same article, the distinction residing in the fact that the machine is in the nature of a retail salesman.

The invention further comprehends the provision of suitable gong or other indicator mechanism which at each actuation of the machine incident to the respective sales will acquaint the purchaser or operator of the number of checks released from within or the number of articles he will receive, as the case may be.

Novel details in the construction and arrangement of the several parts of the mechanism will be apparent from the detailed description hereinafter given when read in connection with the accompanying drawings, forming part hereof, similar reference characters indicating corresponding parts or features in the several views.

In the drawings a convenient embodiment of the invention is disclosed for the sake of illustration merely, and it is to be expressly understood that it is not the intention in the future interpretation as to the scope of the invention to be restricted to any of the structural elements shown except in so far as any such may be specifically included in the appended claims. The embodiment referred to discloses the present invention as applied to any ordinary clock mechanism and to be used in conjunction therewith, the gong mechanism of said clock being shown as converted into a gong indicator in accordance with the objects of the invention hereinbefore outlined.

Figure 2:
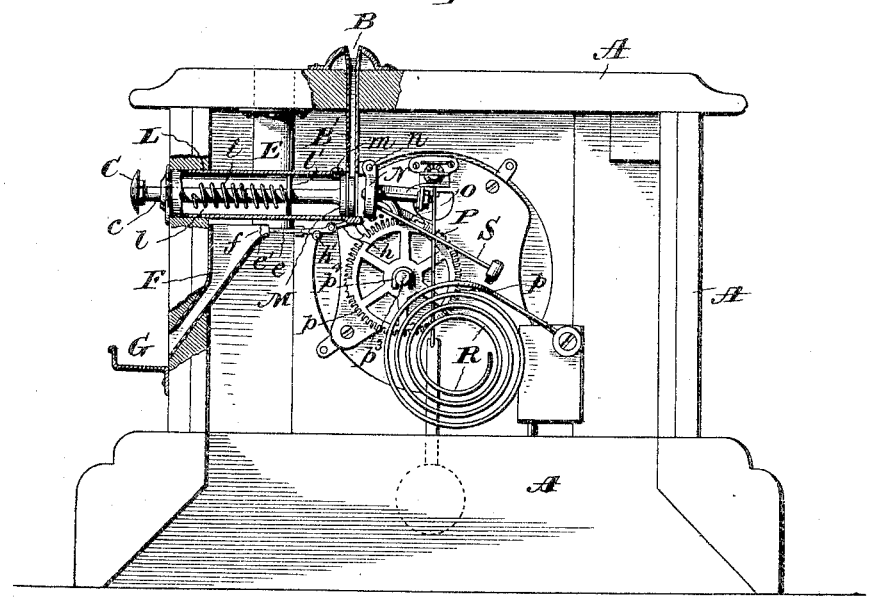

Figure 1 is a face view of the clock, showing those features of the invention projecting without the casing thereof. Fig. 2 is a vertical sectional view of Fig. 1 looking at the same from the rear thereof. Fig. 3 is an elevation of the right-hand end of Fig. 1, illustrating the point of entrance of an actuating-coin and also the point of exit of an indicator-check. Fig. 4 is an enlarged detail view of the check-ejecting mechanism. Fig. 5 is a cross-sectional view of the check-holder, taken on the line $x\,x$ of Fig. 4, and also showing in plan the immediately associated parts. Fig. 6 is an enlarged detail horizontal section, and Fig. 7 is a detail perspective of the escapement-detent.

Referring now more specifically to the drawings, A designates the casing of a clock of any approved type, provided with a gong-actuating train, not necessary to be herein shown in detail, but which for convenience in rendering clear the invention herein may be said to be of that construction illustrated in the patent to Bannatyne, No. 610,753, dated September 13, 1898.

B is the slotted mouth of a coin-chute B', extending to the top of the clock-casing and arranged to guide the actuating-coin into a position to be engaged by the operating-rod C, which is designed to put in motion the interior mechanism to eject an indicator-check or other article D from a holder E and into the slideway F, opening through the side of the clock-casing and discharging into a tray or receiver G, secured to said side of the casing. At the lower end of the check-holder is secured a supporting ledge or plate $e$, on which the stack of coins or checks in the holder rest. This plate extends across but slightly more than half the opening in the bottom of the holder, so that a check may be ejected through the opening $e'$ therein, which registers with the mouth $f$ of the slideway F. The wall of the holder adjacent to the inner edge of the plate $e$ is cut away, as at $e^2$, to permit the entrance thereto of the ejector H, carried at the ends of the arm $h$. The plate $e$ is in turn slotted at $e^3$ to accommodate the arm $h$ when the ejector is forced into the holder by mechanism to be presently described, said ejector comprising separated laterally-extending flanges on the arm $h$, adapted to slide over and beneath the plate $e$, whereby the upper flanges will engage the edge of the lowermost check D and force the same through the opening $e'$ into the slideway F. The arm $h$ is guided in its horizontal movement by a transversely-grooved pin $h'$, secured at a suitable point to the framework of the mechanism and underlying said arm at a point intermediate its ends. The inner end of the arm $h$ is pivoted at $h^2$ to an eccentric-strap $i$, carried by an eccentric I, secured upon the shaft $i'$, extending rearwardly from one of the gears K of the gong-train of the clock. It will thus be seen that upon each rotation of the eccentric I the arm $h$ will be thrust outwardly and correspondingly retracted through the medium of the eccentric-strap $i$.

The mechanism for imparting motion to the eccentric and stopping said motion periodically may now be described.

L is a cylindrical guide extending into the clock-casing, and slidable within the same is the operating-rod C before designated, the same carrying a plunger M at its inner end normally retracted by a spring $l$, coiled about the rod C and secured at one end thereto, while the opposite end contacts an abutment $l'$, fixed within said cylindrical guide L. The plunger is prevented an excessive inward movement by the stop $m$, secured to the guide L and projecting into the path of movement of said plunger. Near the inner end of the guide L, with its edge approximately flush with the inner surface of the plunger M, is an opening $l^2$ in alinement with the discharge end of the coin-chute B', through which an actuating-coin may pass into the end of the guide L and into the path of movement of the plunger M, where said actuating-coin will temporarily rest until thrown from the end of the guide by the inward thrusting of the plunger by the operating-rod C. Pivoted at $n$ and normally suspended by force of gravity in a state of approximate parallelism with the end surface of the plunger M is a plate N, and secured centrally to said plate and projecting outwardly therefrom is a rod $n'$, which is in turn screw-threaded and carries an inwardly-extended tripping-arm $n^2$, said tripping-arm being adjustable longitudinally of the rod $n'$ and secured in adjusted positions through the medium of the nuts $n^3$ engaging the threaded portion of the rod in an obvious manner. This tripping-arm is arranged to project between branches $o$ and $o'$ of an escapement-detent O, pivoted at $o^2$ to a shaft $o^3$, which leads to and is operatively connected in any desired manner to the gong-actuating means constituting a portion of the clock-movement, (not shown herein,) but similar to that of the Bannatyne patent hereinbefore referred to, such actuating means, however, constituting no part of the present invention. The branch $o'$ has an offset end $p$, arranged to engage the teeth $p'$ of an escapement-wheel P, presently to be more particularly described, while the branch $o$ thereof has an oppositely-disposed offset end $k$, arranged to engage a stop $k'$ on a gear K' of the gong-train which meshes with the gear K on the eccentric-shaft $i'$. The teeth of the escapement-wheel P are all arranged at the same distance apart, so that each tooth may be engaged by a pin $p^2$ on the eccentric I, whereby upon each rotation of said eccentric the pin will engage one tooth of the said wheel and rotate the wheel a distance equal to said tooth, the wheel being loosely mounted upon a fixed shaft $p^3$ by means of a U-shaped spring $p^4$ inserted between a head on the shaft and the surface of the wheel.

From so much of the description the operation may be understood as follows: Upon the insertion of a coin—say a five-cent piece Q—into the mouth B of the coin-chute B' the same will fall through said chute into the end of the cylindrical guide L between the pivoted plate N and the plunger M, when the operating-rod may be forced inwardly, whereby the plunger ejects the coin from the end of the guide and the coin pressing against the adjacent face of the plate N causes the same to rock upon its pivot $n$, thereby elevating the end of the rod $n'$, carried thereby and incidentally the trip $n^2$. This movement of the trip will bring the same into contact with the branch $o$ of the excapement-detent O, thereby raising the offset portion $k$ thereof from engagement with the stop-pin $k'$ on the gear K' and correspondingly releasing the offset portion $p$ from engagement with the teeth of the escapement P. As soon as the gear K' is released the gong-train of the clock is free to operate, and its actuation will rotate the shaft $i'$ of the eccentric I, said eccentric rotating with said shaft which carries its strap $i$ toward the check-holder E, thereby thrusting the ejector H into said holder, whereby the lowermost check therein is forced through the opening $e'$ at the bottom of the holder, whereupon the released check will fall into the slideway F, whence it will be delivered into the tray G on the exterior of the clock-casing within easy access of the operator. The rotation of the eccentric, as stated, will also carry the pin $p^2$ into engagement with a tooth of the escapement-wheel to correspondingly rotate said wheel. During this movement the gong-actuating means will hold the escapement-detent O in elevated position, when, said means having also made a complete movement, the detent will be again lowered into its normal position, whereby the offset $p$ will engage a tooth of the escapement-wheel and temporarily lock the same against further rotation, and the offset $k$ will travel across the path of the stop-pin $p^2$ to retard the movement of the gong-train.

It will be noted that some of the teeth of the escapement-wheel are relatively long while others are relatively short, which is for the purpose at predetermined intervals to prevent the offset $k$ from entering the path of the stop-pin $k'$ until the operating mechanism has made two, three, four, or any other number more than one, as the case may be, cycles of movement, it being appreciated that when the offset $p$ engages the shorter teeth the offset $k$ will be suspended out of the path of the pin $k'$. In this manner a single actuating-coin will at certain times cause the ejection of a plurality of checks.

As described in the first portion of this specification, the machine illustrated herein is devised, primarily, for the sale of checks each indicative of a given grade of cigar, and to this end the proportions of the operating parts are arranged in this wise: The escapement-wheel is provided with seventy-eight teeth, each representing a single check to be ejected from the machine and in exchange for which the purchaser is to receive a cigar of a previously-determined grade from the owner or proprietor of the machine. For the sake of simplicity we will suppose that the cigars to be vended are the ordinary five-cent or six-for-a-quarter variety, and inasmuch as the machine is designed to retail the cigars at wholesale prices—twenty-five cents for every six cigars—and there being thirteen half-dozen teeth the proprietor expects to receive in payment five cents for each of sixty-five checks out of every seventy-eight ejected from the machine. Consequently the difference of thirteen checks, which represents the sixth cigar in the thirteen half-dozen, are to be utilized as premiums or a gratis distribution among fortunate purchasers operating the machine, thereby offering an inducement for patronizing the machine. The thirteen extra teeth are the shorter teeth disposed as desired in series of two, three, four, and five—in the present instance there being two series of fours—the number of each series in addition to one representing the premium cigars or other articles. Of course this arrangement is arbitrary, simply being illustrative of the idea of providing the shorter teeth which will permit of several cycles of movement of the operating parts and a corresponding ejection of checks or other articles before the parts are brought to a stop by the engagement of the offset $k$ of the escapement-detent with the stop $k'$ of the actuating-train.

It is desirable that some means other than the ejected checks be employed to indicate to the purchaser or proprietor of the machine the number of checks or articles to which the purchaser or operator is entitled. I therefore provide a striking mechanism comprising an alarm R of the ordinary spiral-wire type, and a hammer S, arranged to strike the same. The hammer S is pivoted at its inner end upon the pin $s$ and carries a relatively short arm T, having an inclined edge $t$, arranged in the path of movement of the pin $p^2$ on the eccentric, so that at each complete rotation of the eccentric said pin will elevate the arm T and hammer S, subsequently permitting the hammer to fall upon the wire R and cause a single alarm. It will thus be seen that the number of alarms struck is dependent upon the number of times the eccentric and escapement-wheel P are permitted to operate as each actuating-coin is deposited.

Having thus described the invention, what is claimed as new, and desired to be secured by Letters Patent, is—

1. In a machine of the character described, a holder, and means for ejecting an article from said holder including a detent pivoted at one end, a coin-controlled trip for said detent arranged at right angles to the detent, and means whereby the trip may be adjusted along the free end of the detent toward or from the pivot thereof to regulate the extent of swinging movement of the detent.

2. In a machine of the character described, a holder, coin-controlled means for ejecting an article from said holder, and means whereby the number of operations of the article-ejecting means is varied according to the time of deposit of the actuating-coin, said means including an escapement-wheel having equidistant teeth, and means whereby each movement of said wheel is the extent of one tooth only.

3. In a machine of the character described, a holder, coin-controlled means for ejecting an article from said holder, and an escapement mechanism whereby the number of operations of the article-ejecting means is varied according to the time of deposit of the actuating-coin, said means including an escapement-wheel having equidistant teeth, and means whereby each movement of said wheel is the extent of one tooth only.

4. In a machine of the character described, a holder, and coin-controlled means for ejecting an article from said holder comprising an operating-rod, a pivoted member operatively related thereto, a trip carried by said pivoted member, an escapement-wheel, said means including an escapement-wheel having equidistant teeth, and means whereby each movement of said wheel is the extent of one tooth only and an escapement-detent arranged to be released by said trip.

5. In a machine of the character described, a holder, coin-controlled means for ejecting an article from said holder, and means whereby the number of operations of the article-ejecting means by actuating-coins of predetermined denominations is controlled, said means including a normally dormant toothed escapement-wheel, and means arranged to engage the teeth of said wheel to shift the same step by step to the extent of one tooth only, said teeth being equidistant.

6. In a machine of the character described, a holder, coin-controlled means for ejecting an article from said holder, and an escapement mechanism whereby the number of operations of the article-ejecting means is varied according to the time of deposit of the actuating-coin, said escapement mechanism including an escapement-wheel, means for rotating the same, an escapement-detent, and a stop carried by said rotating means and arranged to be engaged by the detent.

7. In a machine of the character described, a holder, coin-controlled means for ejecting an article from said holder, and an escapement mechanism whereby the number of operations of the article-ejecting means is varied according to the time of deposit of the actuating-coin, said escapement mechanism including an escapement-wheel having relatively long and short teeth, means for rotating said wheel, an escapement-detent arranged to engage the teeth of said wheel, and a stop carried by said rotating means and arranged to be engaged by the detent when the same is in engagement with the longer teeth of the escapement-wheel.

8. In a machine of the character described, a holder, coin-controlled means for ejecting an article from said holder, and an escapement mechanism whereby the number of operations of the article-ejecting means is varied according to the time of deposit of the actuating-coin, said escapement mechanism including an escapement-wheel having relatively long and short teeth, the shorter teeth being arranged in series of different numbers, means for rotating said wheel, an escapement-detent arranged to engage the teeth of said wheel, and a stop carried by said rotating means and arranged to be engaged by the detent when the same is in engagement with the longer teeth of the escapement-wheel.

9. In a machine of the character described, a holder, coin-controlled means for ejecting an article from said holder, and an escapement mechanism whereby the number of operations of the article-ejecting means is varied according to the time of deposit of the actuating-coin, said escapement mechanism including an escapement-wheel having relatively long and short teeth, the shorter teeth being arranged in series and the respective series being separated from the next adjacent series by the longer teeth, means for rotating said wheel, and a stop carried by said rotating means and arranged to be engaged by the detent when the same is in engagement with the longer teeth of the escapement-wheel.

10. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, means for rotating said wheel, an escapement-detent and a stop carried by said rotating means and arranged to be engaged by the detent when the same is in engagement with the longer teeth of the escapement-wheel.

11. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, means for rotating said wheel, an escapement-detent having separated branches, one branch of the detent being arranged to engage the teeth of the escapement-wheel, and a stop carried by said rotating means and arranged to be engaged by the other branch of said detent when the first-mentioned branch is in engagement with the longer teeth of the escapement-wheel.

12. In a machine of the character described, a holder, coin-controlled means for ejecting an article from said holder, and an escapement mechanism whereby the number of operations of the article-ejecting means is varied, said escapement mechanism including an escapement-wheel having long and short teeth, means for rotating the same, an escapement-detent having separated branches, one branch of the detent being arranged to engage the teeth of the escapement-wheel, and a stop carried by said rotating means and arranged to be engaged by the other branch of said detent when the first-mentioned branch is in engagement with the longer teeth of the escapement-wheel.

13. In a machine of the character described, a holder, coin-controlled means for ejecting an article from said holder, and an escapement mechanism whereby the number of operations of the article-ejecting means is varied, said escapement mechanism including an escapement-wheel having long and short teeth, means for rotating the same, an escapement-detent having separated branches, one branch of the detent being arranged to engage the teeth of the escapement-wheel, a stop carried by said rotating means and arranged to be engaged by the other branch of said detent when the first-mentioned branch is in engagement with the longer teeth of the escapement-wheel, and a trip for the detent projecting into the space between the branches thereof.

14. In a machine of the character described, a holder, coin-controlled means for ejecting an article from said holder, and an escapement mechanism whereby the number of operations of the article-ejecting means is varied, said escapement mechanism including an escapement-wheel having long and short teeth, means for rotating the same, an escapement-detent having separated branches, one branch of the detent being arranged to engage the teeth of the escapement-wheel, a stop carried by said rotating means and arranged to be engaged by the other branch of said detent when the first-mentioned branch is in engagement with the longer teeth of the escapement-wheel, a trip for the detent projecting into the space between the branches thereof, and means for adjusting said trip to regulate the throw of the detent.

15. In a machine of the character described, a holder, coin-controlled means for ejecting an article from said holder, and an escapement mechanism whereby the number of operations of the article-ejecting means is varied, said escapement mechanism including an escapement-wheel having long and short teeth, means for rotating the same, an escapement-detent having separated branches, one branch of the detent being arranged to engage the teeth of the escapement-wheel, a stop carried by said rotating means and arranged to be engaged by the other branch of said detent when the first-mentioned branch is in engagement with the longer teeth of the escapement-wheel, and instrumentalities for tripping said detent and for regulating the throw thereof.

16. In a machine of the character described, a holder, coin-controlled means for ejecting an article from said holder, and an escapement mechanism whereby the number of operations of the article-ejecting means is varied, said escapement mechanism including an escapement-wheel having equidistant teeth, means for rotating the same step by step the distance of one tooth only, and means for stopping the movement of said rotating means.

17. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, means for rotating said wheel, an escapement-detent arranged to engage the teeth of said wheel, and a stop for retarding the movement of said rotating means.

18. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, the shorter teeth being arranged in series of different numbers, means for rotating said wheel, an escapement-detent arranged to engage the teeth of said wheel, in combination with a stop for retarding the movement of said rotating means.

19. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, the shorter teeth being arranged in series and the respective series being separated from the next adjacent series by the longer teeth, means for rotating said wheel, in combination with a stop for retarding the movement of the rotating means.

20. In a machine of the character described, a holder, coin-controlled means for ejecting an article from said holder, and an escapement mechanism whereby the number of operations of the article-ejecting means is varied, said escapement mechanism including a toothed escapement-wheel, means for rotating the escapement-wheel comprising a rotary member carrying a projection arranged to engage the teeth of the escapement-wheel, means for retarding the movement of said rotating means, in combination with an alarm-indicator including a pivoted hammer having a projecting arm arranged in the path of movement of the projection of the rotary member of the escapement-wheel-rotating means.

21. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, an escapement-detent, means for rotating the escapement-wheel comprising a rotary member carrying a projection arranged to engage the teeth of the escapement-wheel, means for retarding the movement of said rotating means, in combination with an alarm-indicator including a pivoted hammer having a projecting arm arranged in the path of movement of the projection of the rotary member of the rotating means for the escapement-wheel.

22. In a machine of the character described, a holder, coin-controlled means for ejecting an article from said holder, and an escapement mechanism whereby the number of operations of the article-ejecting means is varied, said escapement mechanism including a toothed escapement-wheel means for rotating the escapement-wheel comprising a rotary member carrying a projection arranged to engage the teeth of the escapement-wheel, means for retarding the movement of said rotating means, in combination with an indicator arranged in the path of movement of and adapted to be actuated by the rotating means for the escapement-wheel.

23. In a machine of the character described, a holder, coin-controlled means for ejecting an article from said holder, and an escapement mechanism whereby the number of operations of the article-ejecting means is varied, said escapement mechanism including an escapement-wheel having relatively long and short teeth, an escapement-detent, means for rotating the escapement-wheel comprising a rotary member carrying a projection arranged to engage the teeth of the escapement-wheel, means for retarding the movement of said rotating means, in combination with an indicator arranged in the path of movement of and adapted to be actuated by the rotating means for the escapement-wheel.

In testimony whereof I affix my signature in presence of two witnesses.

WILLIAM C. JONES.

Witnesses:
G. EDW. MARTIN,
F. R. GOODE.